(12) United States Patent
Huck et al.

(10) Patent No.: US 6,212,539 B1
(45) Date of Patent: Apr. 3, 2001

(54) METHODS AND APPARATUS FOR HANDLING AND STORING BI-ENDIAN WORDS IN A FLOATING-POINT PROCESSOR

(75) Inventors: Jerome C. Huck, Palo Alto; Peter Markstein, Woodside, both of CA (US); Glenn T. Colon-Bonet, Fort Collins, CO (US); Alan H. Karp, Palo Alto, CA (US); Roger Golliver, Beaverton, OR (US); Michael Morrison; Gautam B. Doshi, both of Sunnyvale, CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/169,483

(22) Filed: Oct. 10, 1998

(51) Int. Cl.[7] .......................................... G06F 7/00
(52) U.S. Cl. ............................... 708/495; 712/222
(58) Field of Search .............................. 708/495; 712/222

(56) References Cited

U.S. PATENT DOCUMENTS

| | | | |
|---|---|---|---|
| 4,603,323 | * | 7/1986 | Hassitt et al. .................... 708/495 |
| 5,729,724 | * | 3/1998 | Sharangpani et al. .............. 712/222 |
| 5,805,475 | * | 9/1998 | Putrino et al. .................... 708/495 |
| 6,112,296 | * | 8/2000 | Witt et al. ........................ 712/222 |

\* cited by examiner

*Primary Examiner*—David H. Malzahn

(57) ABSTRACT

A floating-point unit of a computer includes a floating-point computation unit, floating-point registers and a floating-point status register. The floating-point status register may include a main status field and one or more alternate status fields. Each of the status fields contains flag and control information. Different floating-point operations may be associated with different status fields. Subfields of the floating-point status register may be updated dynamically during operation. The control bits of the alternate status fields may include a trap disable bit for deferring interruptions during speculative execution. A widest range exponent control bit in the status fields may be used to prevent interruptions when the exponent of an intermediate result is within the range of the register format but exceeds the range of the memory format. The floating-point data may be stored in big endian or little endian format.

14 Claims, 8 Drawing Sheets

| Field | Bit Range | Description |
| --- | --- | --- |
| ftz | 0 | Flush-to-Zero mode |
| wre | 1 | Widest range exponent |
| pc | 3:2 | Precision control |
| rc | 5:4 | Rounding control |
| td | 6 | Traps disabled |
| v | 7 | Invalid Operation (IEEE) |
| d | 8 | Denormal/Unnormal Operand |
| z | 9 | Zero Divide (IEEE) |
| o | 10 | Overflow (IEEE) |
| u | 11 | Underflow (IEEE) |
| i | 12 | Inexact (IEEE) |

- Single Precision - 4-byte alignment, implicit leading bit

- Double Precision - 8-byte alignment, implicit leading bit

- Double Extended - 16-byte alignment, explicit leading bit

- Quad Precision - 16-byte alignment, implicit leading bit

METHODS AND APPARATUS FOR HANDLING AND STORING BI-ENDIAN WORDS IN A FLOATING-POINT PROCESSOR

FIELD OF THE INVENTION

This invention relates to the architecture of a floating-point unit in a computer and, more particularly, to methods and apparatus for handling and storing bi-endian words in a floating-point processor.

BACKGROUND OF THE INVENTION

Floating-point units for performing floating arithmetic in a computer typically include a floating-point computation unit, a set of floating-point registers for holding operands, intermediate results and the like, and a floating-point status register. The floating-point computation unit is typically pipelined so that different operations of different floating-point calculations may be performed simultaneously. The floating-point status register includes control information, such as precision control and rounding control, that controls the floating-point calculation. In addition, the floating-point status register includes flag information, such as overflow and zero divide flags which record exceptions that occurred during a floating-point calculation.

Floating-point units are typically configured for compliance with ANSI/IEEE floating-point standard no. 754-1985. This standard specifies floating-point data types, various arithmetic and other operations, and handling of exceptions. It is desirable to provide a floating-point unit which meets the IEEE floating-point standard in all respects and which has additional features that overcome drawbacks in the prior art and thereby enhance performance.

The conventional floating-point status register is a hardware register that contains control information and flag information as described above. The control information is set by software, and the flag information is set in response to execution of a floating-point calculation. Conventionally, the control information is modified by copying the contents of the floating-point status register to a general purpose register, modifying the contents of the general purpose register and then writing the contents of the general purpose register back to the floating-point status register. The flag information in the floating-point status register may be cleared in a similar manner. Thus, the operations of updating control information and clearing flag information are relatively time-consuming. Furthermore, when the control information in the floating-point status register is updated, it is necessary to flush the pipelined floating-point computation unit, thereby aborting partially completed calculations and degrading performance. Because of these drawbacks, frequent updating of the floating-point status register is typically avoided.

The execution of speculative operations is a known technique for enhancing processor performance. In order to maximize utilization of a processor, instructions that appear later in a program may be scheduled for execution in parallel with earlier instructions, if the operands necessary for execution are available. Because branch instructions are usually present in the program, it may not be possible to determine in advance whether an instruction will require execution. However, if resources of the processor are otherwise idle, the performance of the processor may be improved by executing instructions speculatively, even though execution of those instructions may later be determined to be unnecessary. Execution of an instruction that follows a branch instruction before execution of the branch instruction is known as speculative execution. If the program ultimately requires execution of the instruction that was executed speculatively, an improvement in performance is obtained. If execution of the speculative instruction is not required, the result is discarded.

The floating-point status register contains flag information in the form of flag bits, or simply "flags". The flags record exceptions that occur during execution of a floating-point calculation. Exceptions may also create interruptions. In the case of speculative execution, it is undesirable to report an exception immediately because the result of the speculative execution may later be discarded. Nonetheless, floating-point units typically handle flags for speculative operations in the same manner as nonspeculative operations.

One of the exceptions that is recorded in the flag information is an overflow exception, where the exponent in the result of the calculation is outside a specified range. The range may be established by the memory format used to store floating-point numbers or by the user of the result. However, the floating-point unit may have the capability of handling floating-point numbers which are outside the range that causes the reporting of an overflow exception. This may give rise to the reporting of overflow exceptions unnecessarily. For example, floating-point calculations typically involve several operations. In certain calculations, the result of an intermediate operation may produce an overflow exception, even though the final result would not produce an overflow exception if the calculation was permitted to continue. It is desirable to avoid reporting exceptions unnecessarily, since execution may be delayed or terminated.

Another aspect of handling floating numbers during floating-point calculations relates to "big endian" and "little endian" formats. In big endian format, a data word is stored in memory with its most significant byte corresponding to the most significant byte of the memory word. In little endian format, a data word is stored in memory with its least significant byte corresponding to the most significant byte of the memory word. A processor may be required to handle both formats efficiently.

It is desirable to provide floating-point architectures which alleviate or eliminate one or more of the above-described drawbacks.

SUMMARY OF THE INVENTION

According to a first aspect of the invention, a method is provided for handling and storing floating-point numbers in a computer comprising a floating-point computation unit, a memory and floating-point registers. Floating-point numbers are held in the floating-point registers in a register format wherein each of the floating-point numbers includes a sign, an exponent and a significand. Each of the floating-point numbers in the register format has more bytes than a word in the memory. In response to a first state of an endian control bit, a floating-point number is stored in first and second consecutive memory words in big endian format such that the sign and the exponent are entirely contained in the first memory word and the significand is entirely contained in the second memory word. In response to a second state of the endian control bit, a floating-point number is stored in the first and second consecutive memory words in little endian format such that the significand is entirely contained in the first memory word, and the sign and the exponent are entirely contained in the second memory word. The floating-point numbers are preferably stored without conversion from the register format.

The step of storing a floating-point number in big endian format may include storing zeros in the most significant byte locations of the memory word containing the exponent and the sign. The step of storing a floating-point number in little endian format may include storing zeros in the least significant byte locations of the memory word containing the exponent and the sign.

According to another aspect of the invention, apparatus is provided for handling and storing floating-point numbers. The apparatus comprises a computer including a floating-point computation unit, a memory and floating-point registers. The apparatus further comprises means for holding floating-point numbers in the floating-point registers in a register format wherein each of the floating-point numbers includes a sign, an exponent and a significand. Each of the floating-point numbers in the register format has more bytes than a word in the memory. The apparatus may further comprise means responsive to a first state of an endian control bit for storing a floating-point number in first and second consecutive memory words in big endian format such that the sign and the exponent are entirely contained in the first memory word and the significand is entirely contained in the second memory word, and means responsive to a second state of the endian control bit for storing a floating-point number in the first and second consecutive memory words in little endian format such that the significand is entirely contained in the first memory word and the sign and the exponent are entirely contained in the second memory word.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
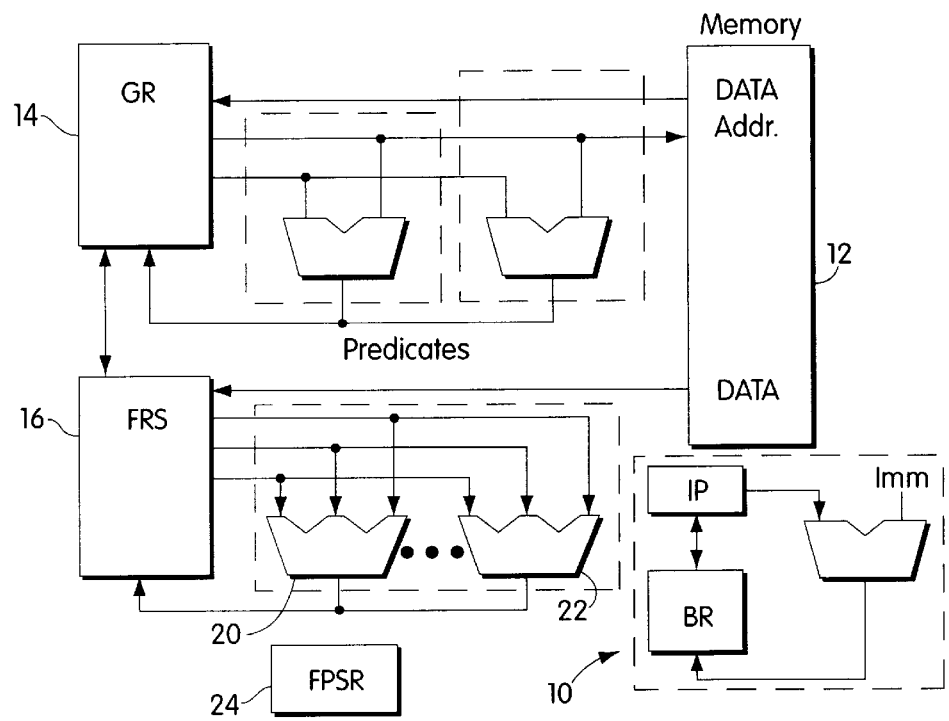
FIG. 1 is a simplified block diagram of a floating-point unit and related processor elements.

A simplified block diagram of a floating-point unit and related processor elements is shown in FIG. 1. The elements shown in FIG. 1 constitute a part of a central processing unit (CPU). An instruction sequencer 10 processes and decodes instructions of a program being executed. The instructions contain addresses of operands in a memory 12. Depending on the type of instruction being executed, operands from memory 12 are supplied to general registers (GR) 14 or floating-point registers (FR) 16. The processor typically includes a number of floating-point registers. Floating-point operands are supplied from floating-point registers 16 to floating-point computation units 20 and 22 for performing floating-point calculations. Results of the floating-point calculations are returned to the floating-point registers 16. The processor may include one or more floating-point computation units. A floating-point status register 24 contains control information that controls the floating-point calculation and flag information which records exceptions that occurred during the floating-point calculation. The floating-point registers 16, the floating-point computation units 20, 22 and the floating-point status register 24 constitute the floating-point unit of the processor.

Figure 2:
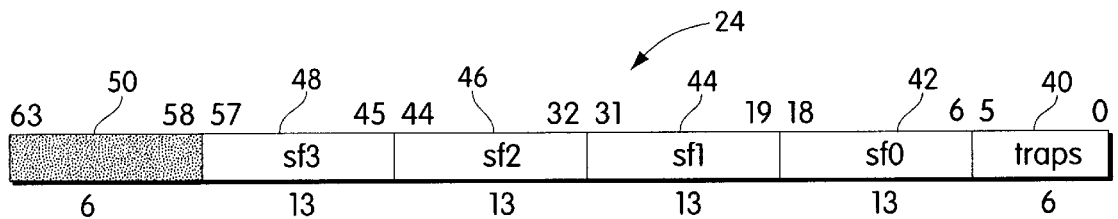
FIG. 2 illustrates an example of a format of a floating-point status register.

An example of a suitable format for the floating-point status register 24 is shown in FIG. 2. A 64-bit architecture is illustrated. The floating-point status register 24 includes a trap field 40, a main status field 42 (sf0) and at least one alternate status field. In the example of FIG. 2, the floating-point status register 24 includes trap field 40, main status field 42 (sf0), alternate status fields 44 (sf1), 46 (sf2) and 48 (sf3), and reserved bits 50. As described below, main status field 42 and alternate status fields 44, 46 and 48 may be associated with different instructions or groups of instructions to provide enhanced control and monitoring of floating-point operations.

By way of example, trap field 40 may contain an invalid operation floating-point exception fault in bit location 0; a denormal/unnormal operand floating-point exception fault in bit location 1; a zero divide floating-point exception fault in bit location 2; an overflow floating-point exception trap in bit location 3; an underflow floating-point exception trap in bit location 4; and an inexact floating-point exception trap in bit location 5. In each case, the fault or trap is disabled when the respective bit is set.

Figure 3:
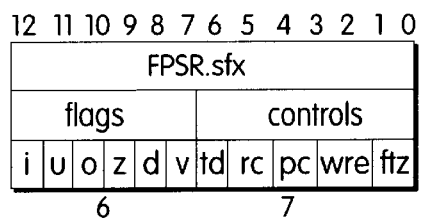
FIG. 3 illustrates an example of a format of each floating-point status field.

An example of a suitable format for each of the status fields sf0, sf1, sf2 and sf3 is shown in FIG. 3. Each status field includes control information for controlling a floating-point calculation and flag information for indicating conditions that occurred during a floating-point calculation.

Figures 4, 5:
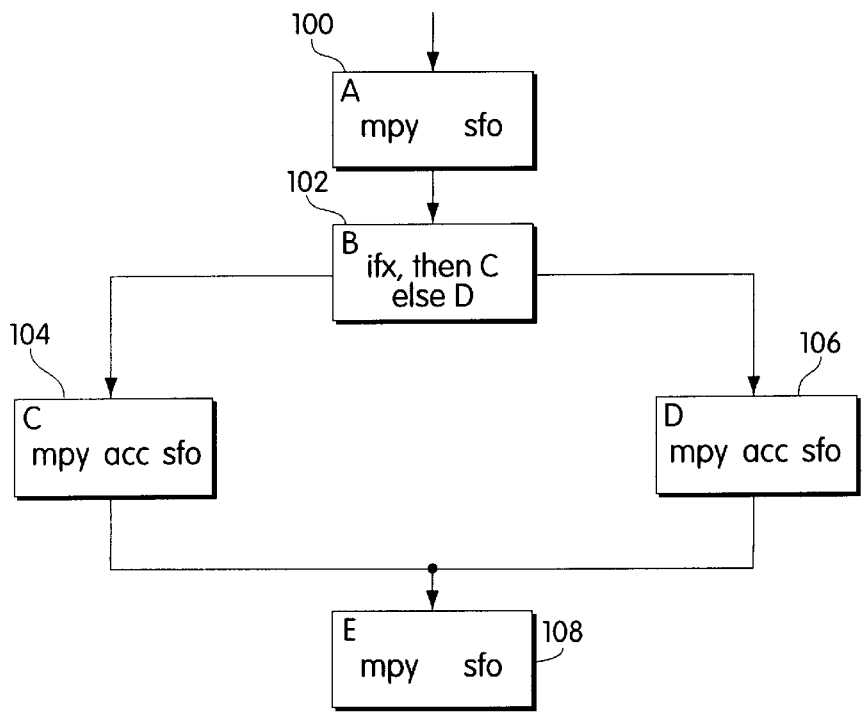
FIG. 4 illustrates an example of bit assignments in each floating-point status field.
FIG. 5 is a flow chart that illustrates an example of a program segment without speculative operation.

An example of suitable bit assignments is shown in FIG. 4. The control bits include a flush-to-zero mode (bit 0), a widest range exponent (bit 1), precision control (bits 3:2), rounding control (bits 5:4) and traps disabled (bit 6). The flag bits include invalid operation (bit 7), denormal/unnormal operand (bit 8), zero divide (bit 9), overflow (bit 10), underflow (bit 11) and inexact (bit 12).

It will be understood that the number of alternate status fields, the number of bits in the main and alternate status fields and the bit assignments in the status field may be varied within the scope of the invention. Furthermore, the status register may contain more or fewer reserved bits, and the reserved bits may be distributed in any desired manner.

In accordance with a feature of the invention, the floating-point instruction set includes instructions for updating specified fields of the floating-point status register. With respect to the control information in each status field, a floatingpoint set controls instruction, designated fsetc.sfx, is used to update control bits in status field x (sfx), where x represents the number of the status field. More specifically, the control bits of a specified status field may be initialized by logically ANDing the main status field sf0 control bits with a mask field in the instruction and logically ORing the main status field sf0 control bits with a second mask field in the instruction. Thus, specified bits in the control field may be set or cleared, or a copy may be made from main status field sf0.

In addition, the floating-point instruction set includes a floating-point clear flags instruction, designated fclrf.sfx. The clear flags instruction clears the flags in status field x. As noted above, the flag bits in the status field may be set as a result of exceptions that occur during a floating-point calculation. The flag bits are considered "sticky bits", meaning that they remain set until cleared. The floating-point set controls instruction and the floating-point clear flags instruction permit bits in a specified status field of the floating-point status register to be set or cleared without affecting other status fields or other subsets of the same status field. Thus, the floating-point status register may be updated without requiring a readmodify-write operation and without halting or flushing the floating-point pipeline.

The floating-point set controls instruction and the floating-point clear flags instruction may be described as instructions which permit specified subfields of the floating-point status register to be set or cleared. As noted above, the control bits of a specified status field may be set or cleared, and the flag bits of a specified status field may be cleared. More generally, one or more bits of a specified status field or a subfield of a specified status field may be set or cleared. As described below, the ability to update the floating-point status register in this manner provides enhanced performance.

Figure 6:
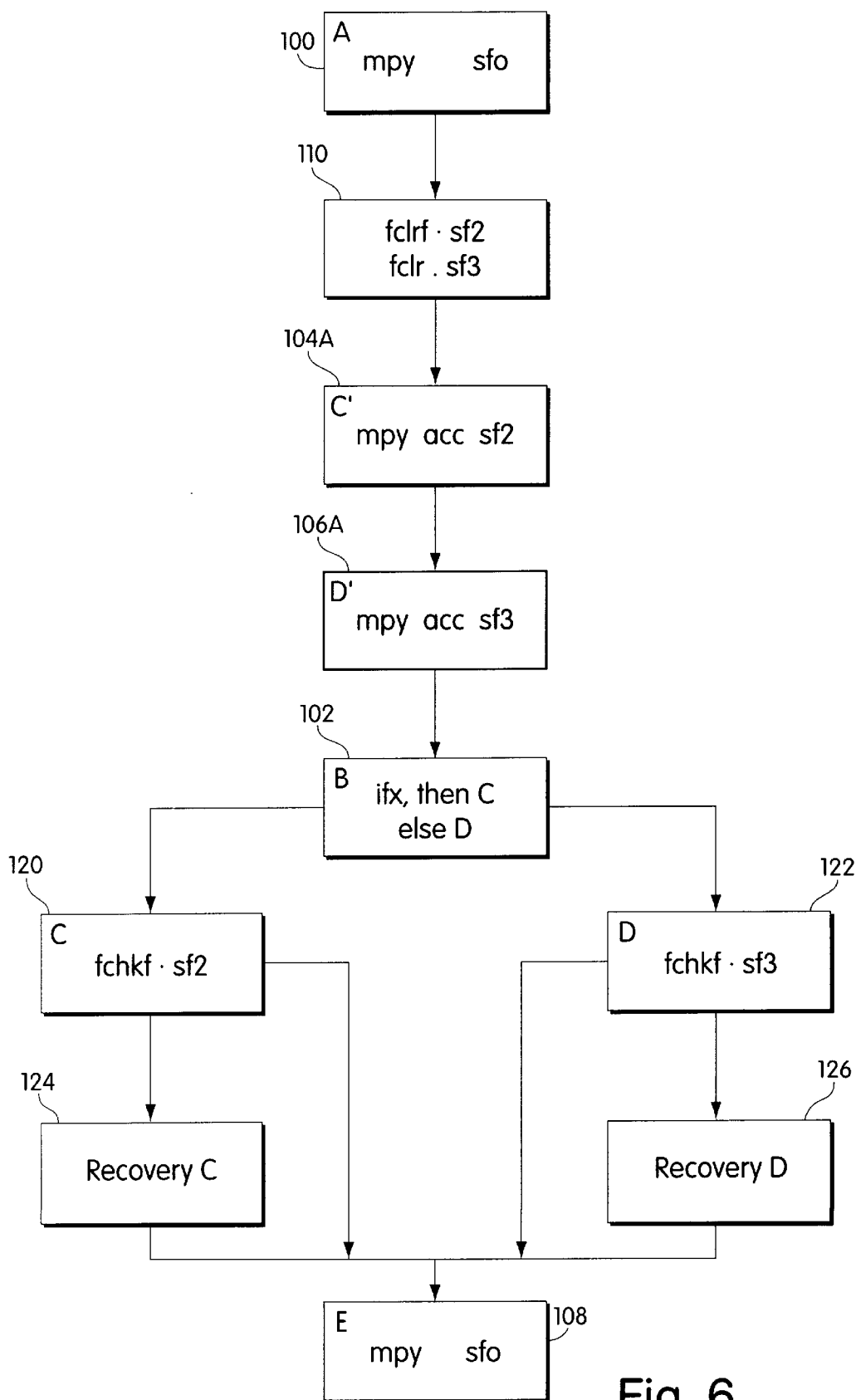
FIG. 6 is a flow chart that illustrates execution of the program segment of FIG. 5 according to a first speculative execution approach.
Figure 7:
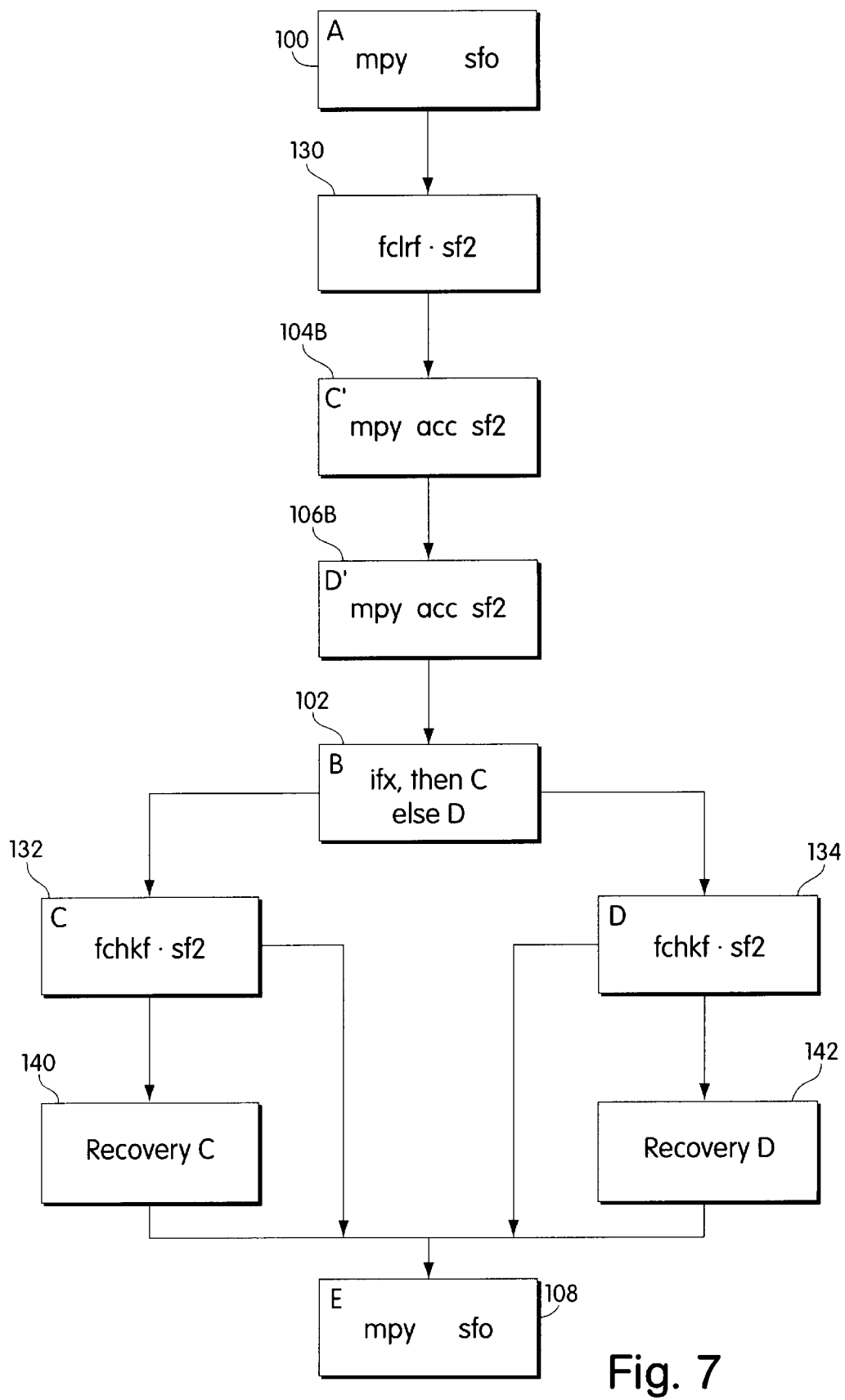
FIG. 7 is a flow chart that illustrates execution of the program segment of FIG. 5 according to a second speculative execution approach.

An example illustrating the operation and utilization of multiple floating-point status fields is described with reference to FIGS. 5 and 6. FIG. 5 illustrates an example of a program segment that does not utilize speculative execution. FIGS. 6 and 7 illustrate different versions of the program segment of FIG. 5 utilizing speculative execution for enhanced performance. It will be understood that FIGS. 5–7 are simplified representations of program segments and that actual program segments may include additional instructions for computer control.

In FIG. 5, a floating-point instruction 100 is followed by a branch instruction 102. Depending on the result of branch instruction 102, the program segment may proceed to instructions 106 and 108 or may branch to instruction 104.

In order to enhance the performance of the processor in executing the program segment of FIG. 5, it may be desirable to utilize speculative execution. When instructions are executed speculatively, they are executed earlier than they appear in the program sequence, so that the result is available at the appropriate point in the program sequence. Speculative execution may be advantageous during periods when processor resources are available and would otherwise be unused. Speculative execution may also be advantageous where an instruction requires multiple cycles for execution and would cause a delay in program execution if executed normally. An example is a memory access instruction. Because instructions that are executed speculatively typically follow a branch instruction, they may not ultimately be required to complete execution of the program. For example, if instruction 106 is executed speculatively and branch instruction 102 results in a branch to instruction 104, then instruction 106 is not required. However, if branch instruction 102 results in the execution of instruction 106, then performance is enhanced by the speculative execution of instruction 106. In FIG. 5, each of instructions 100, 104, 106 and 108 utilizes main status field sf0 in the floating-point status register.

Referring now to FIG. 6, the program segment of FIG. 5 is modified to utilize speculative execution. Like instructions in FIGS. 5 and 6 have the same reference numerals. As shown in FIG. 6, instructions 104A and 106A, which correspond to instructions 104 and 106, respectively, in FIG. 5, are executed before branch instruction 102. Instructions 104A and 106A are shown being executed immediately before branch instruction 102. However, it will be understood that instructions 104A and 106A may be executed at any time prior to branch instruction 102 when the data necessary for execution of these instructions is available. Furthermore, a single instruction or a sequence of instructions may be executed speculatively.

Instruction 100, a nonspeculative instruction, is assigned to main status field sf0. Speculative instructions 104A and 106A are assigned to alternate status fields sf2 and sf3, respectively, in the floating-point status register. In order to ensure that the flag bits in alternate status fields sf2 and sf3 are cleared prior to execution of instructions 104A and 106A, clear flag instructions 110, designated fclrf.sf2 and fclrf.sf3, are used to clear the flag bits in alternate status fields sf2 and sf3.

Preferably, each floating-point instruction contains a field that specifies the status field to be used by and associated with that instruction. Where the floating-point status register contains a main status field and three alternate status fields, a two-bit field in the floating-point instruction specifies the status field.

With further reference to FIGS. 5 and 6, it may be seen that instruction 104 in FIG. 5 is replaced with a check flags instruction 120 in FIG. 6. Furthermore, instruction 106 in FIG. 5 is replaced with a check flags instruction 122 in FIG. 6. Check flags instruction 120, designated fchkf.sf2, checks the flag bits in alternate status field sf2. Similarly, check flags instruction 122, designated fchkf.sf3, checks the flag bits in alternate status field sf3.

Any flag bits which are set in a status field indicate an exception that occurred during execution of the associated instruction or sequence of instructions. The exception is recorded in the flag bits and may potentially cause a program interruption. However, in the case of speculative execution, setting of the flag bits in the main status field or a program interruption should not occur until it is determined that the speculative instruction is actually needed. If the speculatively-executed instruction is discarded, the interruption would produce unnecessary delay in processor operation and would incorrectly interrupt the program. As described below, the alternate status fields provide a mechanism for recording exceptions during speculative execution, while deferring conventional reporting of exceptions until such time as the speculatively-executed instruction is committed.

The floating-point status register configuration shown in FIGS. 2–4 and described above permits interruptions that would otherwise occur during speculative execution to be deferred or avoided entirely. Referring again to FIGS. 3 and 4, the control bits include a trap disable, TD, bit. When the TD bit is set in one or more of the alternate status fields, an exception during execution of the instruction associated with the status field does not produce interruption. The floatingpoint check flags instruction, designated fchkf.sfx, checks the flag bits in alternate status field x when the speculatively-executed instruction is needed, or committed. More specifically, the floating-point check flags instruction compares the flag bits in alternate status field x with the flag bits in main status field sf0 and with the trap enable bits in the floating-point status register. A branch to a recovery operation occurs if: 1) flag bits which are set in alternate status field sfx correspond to enabled traps in the floating-point status register, or 2) flag bits which are set in alternate status field sfx are not set in main status field sf0.

Referring again to FIG. 6, the trap disable bit is set in alternate status fields sf2 and sf3 during the speculative execution of instructions 104A and 106A. The flag bits in alternate status fields sf2 and sf3 may be set as a result of an exception that occurs during the execution of instructions 104A and 106A, respectively. However, the TD bit prevents a program interruption. When the program advances to instruction 120 or instruction 122, a floating-point check flags instruction is executed. In particular, assume that the branch instruction 102 requires the speculatively-executed instruction 106A to be committed. The program proceeds from branch instruction 102 to check flags instruction 122. Instruction 122 compares the flag bits in alternate status field sf3 with the flag bits in main status field sf0 and with the trap enable bits in the floating-point status register. A branch to a recovery operation 126 occurs if: 1) flag bits which are set in alternate status field sf3 correspond to enabled traps in the floating-point status register, or 2) flag bits which are set in alternate status field sf3 are not set in main status field sf0. If neither of these conditions is met, the recovery operation 126 is unnecessary, and the program proceeds directly to instruction 108.

The recovery operation 126 involves reexecution of the speculatively-executed instruction or instructions, in this example instruction 106A. During reexecution, the reexecuted instruction is associated with main status field sf0. One or more flag bits may be set in main status field sf0, and an interruption may be generated if the corresponding trap is enabled. Thus, exception reporting is deferred until speculatively-executed instruction 106A is committed. If branch instruction 102 had required execution of instruction 120, the exception reporting associated with instruction 106A would have been avoided.

If the branch instruction 102 requires the speculatively-executed instruction 104A, rather than instruction 106A, to be committed, the program proceeds to check flags instruction 120 in a manner similar to that described above. Instruction 120 compares the flag bits in alternate status field sf2 with the flag bits in main status field sf0 and with the trap enable bits in the floating-point status register. A branch to a recovery operation 124 occurs if: 1) flag bits which are set in alternate status field sf2 correspond to enabled traps in the floating-point status register, or 2) flag bits which are set in alternate status field sf2 are not set in main status field sf0. If neither of these conditions is met, the recovery operation 124 is unnecessary, and the program jumps to instruction 108.

The recovery operation 124 involves reexecution of the speculatively-executed instruction or instructions, in this example instruction 106A. During reexecution, the reexecuted instruction is associated with main status field sf0. One or more flag bits may be set in main status field sf0, and an interruption may be generated if the corresponding trap is enabled.

The TD bit is not used in the main status field sf0, and nonspeculative instructions are typically assigned to main status field sf0. When instructions assigned to main status field sf0 are executed, exceptions are reported immediately.

In some instances, the number of speculative instructions or instruction sequences being executed may exceed the number of alternate status fields available in the floating-point status register. In that case, more than one speculatively-executed instruction or instruction sequence may be shared by a single alternate status field in the floating-point status register. In this situation, when one or more of the flag bits is set in the shared alternate status field, there is an ambiguity as to which of the instructions sharing the alternate status field caused the flag bit or bits to be set. A technique for overcoming this difficulty is described with reference to FIG. 7.

In FIG. 7, the program segment of FIG. 5 is again modified to utilize speculative execution. Like instructions in FIGS. 5 and 7 have the same reference numerals. As shown in FIG. 7, instructions 104B and 106B, which correspond to instructions 104 and 106, respectively, in FIG. 5, are executed before branch instruction 102.

Instruction 100, a nonspeculative instruction, is assigned to main status field sf0. Speculative instructions 104B and 106B are assigned to and share alternate status field sf2 in the floating-point status register. In order to ensure that the flag bits in alternate status field sf2 are cleared prior to execution of instructions 104B and 106B, a clear flags instruction 130, designated fclrf.sf2, is used to clear the flag bits in alternate status field sf2.

With further reference to FIGS. 5 and 7, instruction 104 in FIG. 5 is replaced with a check flag instruction 132, designated fchkf.sf2, in FIG. 7. Furthermore, instruction 106 in FIG. 5 is replaced with a check flag instruction 134, designated fchkf.sf2, in FIG. 7. Check flag instructions 132 and 134 each check the flag bits in alternate status field sf2.

In the program segment of FIG. 7, exceptions during execution of either or both of instructions 104B and 106B may cause flag bits in alternate status field sf2 to be set. Because the trap disable bit is set in alternate status field sf2, exceptions are not reported when instructions 104B and 106B are speculatively executed.

Following branch instruction 102, check flags instruction 132 or check flags instruction 134 is executed. Check flag instruction 132 or 134 compares the flag bits in alternate status field sf2 with the flag bits in main status field sf0 and with the trap enable bits in the floating-point status register. A branch to a recovery operation occurs if: 1) flag bits which are set in alternate status field sf2 correspond to enabled traps in the floating-point status register, or 2) flag bits which are set in alternate status field sf2 are not set in main status field sf0. In particular, check flag instruction 132 branches to recovery operation 140, and check flag instruction 134 branches to recovery operation 142. If neither of the above conditions is met, the respective recovery operation is unnecessary, and the program proceeds directly to instruction 108.

Since alternate status field sf2 is shared by instructions 104B and 106B in this example, it cannot be determined from alternate status field sf2 alone which of instructions 104B and 106B caused one or more flag bits to be set. To determine this information, recovery operations 140 and 142 operate as follows. Initially, the speculative instruction or instruction sequence that is to be committed is reexecuted, with main status field sf0 associated with the reexecuted instructions. One or more flag bits may be set in main status field sf0 during the reexecution of the instructions being committed. In addition, an interruption may be generated if the corresponding trap is enabled in the floating-point status register. Next, the shared alternate status field is cleared. Then, any instruction or instruction sequences which share the alternate status field but are not being committed at this time are reexecuted. The alternate status field is associated with reexecution of the uncommitted instructions. Any exceptions that occur during reexecution of the uncommitted instructions cause flag bits to be set in the alternate status field. This sequence of recovery operations effectively removes the flag information for the committed instruction or instruction sequence from the alternate status field and transfers it to the main status field. The alternate status field then holds flag information for the remaining instructions which share the alternate status field but were not committed.

Referring again to the example of FIG. 7, assume that branch instruction 102 requires the speculatively-executed instruction 1 06B to be committed. The program proceeds to check flags instruction 134. Check flags instruction 134 compares the flag bits in alternate status field sf2 with the flag bits in main status field sf0 and with the trap enable bits in the floating-point status register. A branch to recovery operation 142 occurs if: 1) flag bits which are set in alternate status field sf2 correspond to enabled traps in the floating-point status register, or 2) flag bits which are set in alternate status field sf2 are not set in main status field sf0. If neither of these conditions is met, recovery operation 142 is unnecessary, and the program proceeds directly to instruction 108.

The recovery operation 142 involves reexecution of speculatively-executed instruction 106B. During reexecution, one or more flag bits may be set in main status field sf0, and an interruption may be generated if the corresponding trap is enabled. Then the flag bits in alternate status field sf2 are cleared, and speculatively executed instruction 104B is reexecuted. During reexecution of instruction 104B, one or more flag bits may be set in alternate status field sf2, but the trap disable bit in alternate status field sf2 prevents an interruption. Now, alternate status field sf2 contains flag information only for speculatively-executed instruction 104B, which may be committed at a later time during program execution.

It may be observed that the program segments of FIGS. 6 and 7 may result in reexecution of instructions, thereby degrading short-term performance. However, in a large fraction of instances of program execution, exceptions do not occur. In those cases, reexecution of instructions is not required, and overall performance is enhanced by speculative execution.

In the case of speculative execution, the alternate status fields permit exceptions that occur during speculative execution to be recorded without affecting main status field sf0. The trap disable bit in each of the alternate status fields prevents generation of an incorrect interruption. The flag information pertaining to the speculatively-executed instructions is utilized when each instruction is committed.

The utility of multiple status fields in the floating-point status register has been described above in connection with speculative execution. However, the multiple status field configuration of the floating-point status register is useful during normal, nonspeculative execution. For example, it may be desirable to utilize different control bits for different instructions in a program sequence without incurring the delay required by the prior art read-modify-write updating of the floating-point status register. Thus, it may be desirable to utilize different rounding and/or truncation modes for different floating-point instructions. This may be accomplished by associating different instructions with different status fields in the floating-point status register. Instructions associated with different status fields may thus have different control bits. In the case of nonspeculative execution, the trap disable bit remains reset. Thus, an exception is reported immediately.

Rotating registers have been utilized to speed up the execution of program loops having instructions which require multiple cycles for execution. The rotating register permits multiple iterations of the program loop to be executed in parallel. When an instruction refers to a register, that register is viewed as a logical register and the corresponding physical register is incremented for each iteration of the loop. Thus, several iterations may be in progress in different registers.

One or more of the alternate status fields in the floating-point status register may be associated with a rotating register. The rotating status field is associated at different times with different iterations of the program loop. In general, the floating-point status register may include one or more status fields that are fixed and one or more status fields that rotate.

Figure 8:
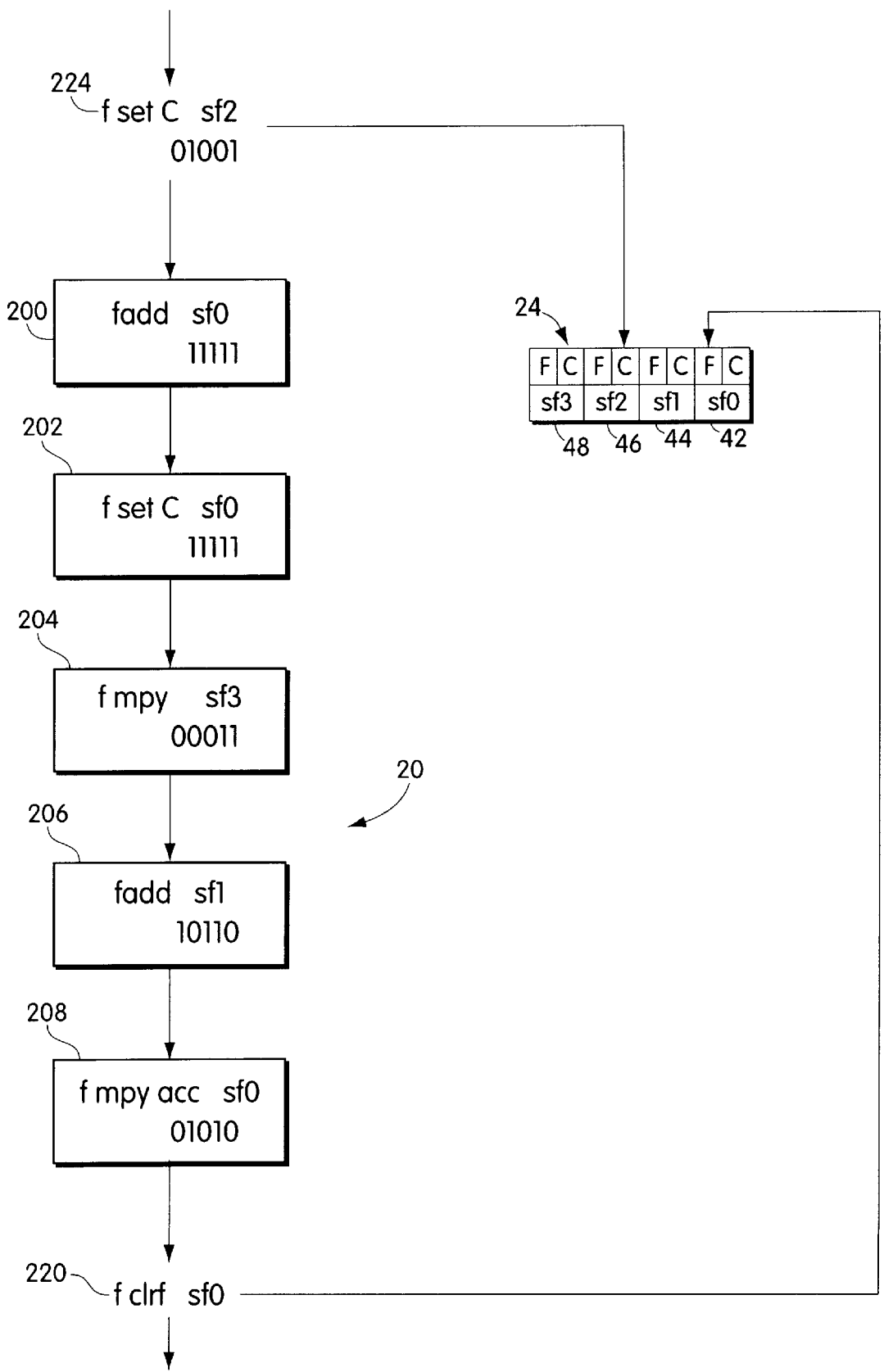
FIG. 8 is a simplified block diagram of a pipelined floating-point computation unit having copies of control bits for each stage.

An example of a technique for updating floating-point status register 24 is described with reference to FIG. 8. Floating-point computation unit 20 has a pipelined architecture including stages 200, 202, 204, 206 and 208. As known in the art, different stages of the pipelined computation unit perform different operations simultaneously for increased operating speed. The operations performed simultaneously by the stages of the computation unit may be associated with one instruction or more than one instruction, since a single instruction may require several operations. For simplicity, FIG. 8 shows one instruction in each stage of the floating-point computation unit. Also shown in FIG. 8 is floating-point status register 24, including main status field sf0 and alternate status fields sf1, sf2 and sf3. As described above, each status field includes control bits C and flag bits F.

The floating-point computation unit 20 is shown at an instant of time when different floating-point instructions are being executed in different stages of the pipelined computation unit. Each floating-point instruction is associated with, or references, one of the status fields sf0, sf1, sf2 and sf3. Thus, for example, stage 204 contains a floating-point multiply instruction, designated fmpy, which references alternate status field sf3. Each of the stages 200, 202, 204, 206 and 208 of the floating-point computation unit 20 contains a copy of the control bits from the referenced status field. The control bits propagate through the pipelined computation unit with the instruction and are used to control that instruction. This permits the status fields to be updated dynamically, so that different instructions in the program sequence may utilize different control information.

Operation of the apparatus of FIG. 8 with respect to status information is described as follows. The floating-point status register 24 is updated by floating-point instructions, including floating-point set controls, fsetc.sfx, where x designates the referenced status field and floating-point clear flags, fclrf.sfx. The floating-point set controls and clear flags instructions are incorporated into the floating-point program sequence and propagate through the pipelined floating-point computation unit with other floating-point instructions. As described above, the floating-point set controls and clear flags instructions permit specified subfields of the floating-point status register to be updated rapidly without affecting other status fields and without affecting other subfields in the same status field.

In the example of FIG. 8, a clear flags instruction 220 has exited from the floating-point computation unit 20. Instruction 220 causes the flag bits in main status field sf0 to be reset. This operation may be performed at the output of the pipelined computation unit as shown. Instructions in the pipeline that follow instruction 220 and designate main status field sf0, such as the instructions in stages 200 and 208, may set one or more of the flag bits in main status field sf0 as a result of an exception that occurs during the respective operations.

Stage 208 indicates that status field sf0 contains control bits 01010. A set controls instruction in stage 202 has updated status field sf0 control bits to 11111. Therefore, those instructions which are upstream in the pipeline from stage 202 and which reference status field sf0 utilize control bits 11111. By contrast, those instructions which are downstream from stage 202 and which reference status field sf0 use control bits 01010. Thus it may be seen that different instructions may utilize different control information from the same status field. The control information may be updated dynamically without delaying operation.

A set controls instruction 224, designated fsetc.sf2, is about to enter the first stage 200 of the pipelined computation unit 20. The instruction 224 may set the control bits in status field sf2, for example, to 01001. Thus, those instructions which are upstream of instruction 224 and which reference status field sf2 utilize the new control bits.

Each floating-point instruction that requires control information may read control information from the referenced status field as it enters the pipelined floating-point computation unit. That control information is carried through the pipeline with the instruction and controls execution of that instruction, even if the referenced status field is updated before completion of the instruction. Thus, for example, the instruction in stage 208, which references status field sf0, obtained control bits 01010 from status field sf0 as it entered the pipelined computation unit. Those control bits control execution of the instruction, even though the control bits in status field sf0 are changed by the set controls instruction in stage 202 before the instruction in stage 208 has exited from the pipeline. This configuration provides a high degree of flexibility and avoids delays associated with prior art techniques for changing status information.

The configuration of FIG. 8 utilizes a protocol where the set controls instruction updates the control bits in the referenced status field when it reaches the input of the pipelined computation unit, and the clear flags instruction clears the flag bits in the referenced status field when it exits from the pipelined computation unit. Furthermore, each floating-point instruction that requires control information reads the referenced status field as it enters the pipelined computation unit. It will be understood that different protocols may be utilized within the scope of the invention. For example, the set controls instruction and the clear flags instruction may update the floating-point status register at earlier or later times relative to the pipelined computation unit. Furthermore, floating-point instructions may read the referenced status information at earlier or later times relative to the pipelined computation unit.

Figure 9:
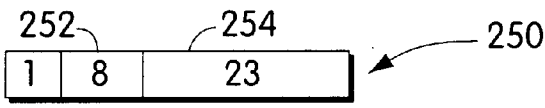
FIG. 9 illustrates memory formats used for storing different floating-point data types.
Figure 9:
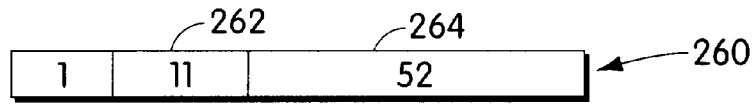
Figure 9:
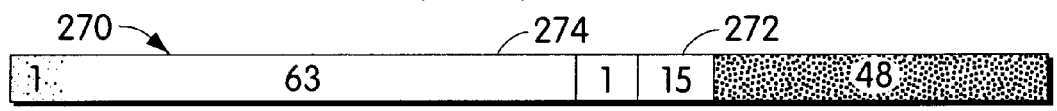
Figure 9:
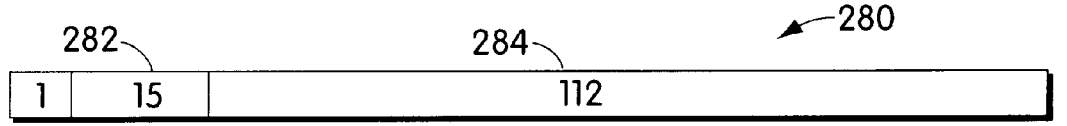

Suitable formats for storage of floating-point numbers in memory in accordance with IEEE standards are shown in FIG. 9. A single precision representation 250 includes an 8-bit exponent 252 and a 23-bit mantissa, or significand, 254. A double precision representation 260 includes an 11-bit exponent 262 and a 52-bit mantissa 264. A double extended representation 270 includes a 15-bit exponent 272 and a 63-bit mantissa 274. A quad precision representation 280 includes a 15-bit exponent 282 and a 112-bit mantissa 284. Each representation includes a sign bit. The largest exponent among the representations is 15 bits.

Figure 10:
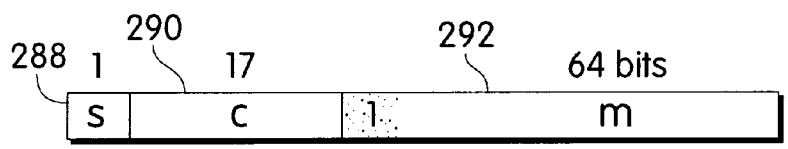
FIG. 10 illustrates an example of a floating-point register format in bit representation.

An example of a register format used in floating-point registers 16 (FIG. 1) is shown in FIG. 10. The register format includes a sign bit 288, an exponent field 290 having 17 bits and a mantissa field 292 having 64 bits. Thus, the exponent field 290 of the register format is larger than the exponent field in any of the memory representations. Preferably, the exponent field of the register format is at least two bits wider than the widest exponent field supported in the memory format.

Prior art floating-point units are typically configured such that a flag bit indicating an overflow exception is set in the status register when the exponent of a result exceeds a given range. The range is selected based on the memory format. Thus, if the exponent exceeds a range which can be stored in memory, an overflow exception is generated. The same range is applied to any intermediate steps and to the final step of the calculation.

In many computations, an intermediate step produces a result that exceeds the exponent range of the memory format, while the final result is within the exponent range of the memory format. Thus, where the floating-point computation unit, including the floating-point registers, has the capability to handle an exponent range that is wider than the exponent range of the memory format, the generation of an overflow exception during intermediate steps is unecessary, as long as the final result is within the exponent range of the memory format.

Figure 11:
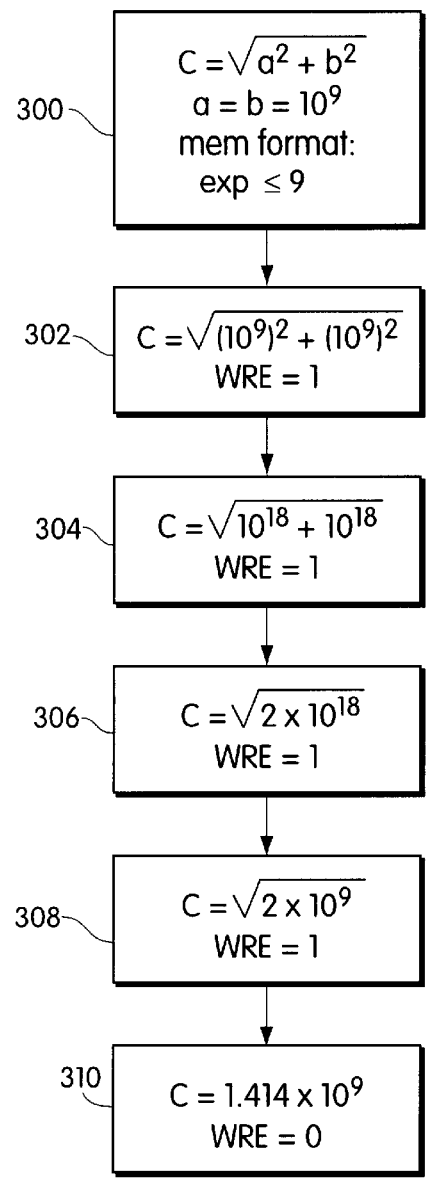
FIG. 11 is a flow chart that illustrates an example of a floating-point calculation where a widest range exponent control bit avoids reporting of an overflow exception.

An example of a floating-point computation of the above type is shown in FIG. 11. A hypotenuse computation is illustrated in block 300. The hypotenuse C is calculated as the square root of the sum of the squares of sides A and B. In the illustrated example, the memory format requires an exponent equal to or less than 9, and the values of A and B are equal to $10^9$. The values of A and B are substituted into the hypotenuse formula in intermediate step 302. Additional intermediate steps 304, 306 and 308 produce a final result in step 310. It may be noted that the exponent exceeds the range of the memory format in steps 304 and 306. However, the exponent of the final result in step 310 is within the range of the memory format (equal to or less than 9). Assuming that the floating-point computation unit is capable of handling exponents in the range generated in intermediate steps 302–308, generation of an overflow exception in these intermediate steps is unnecessary, because the final result in step 310 is within the exponent range of the memory format. In particular, only the final result is required to be stored in the memory format.

In accordance with a feature of the invention, the floating-point status register 24 (FIGS. 1–4) includes a widest range exponent (WRE) bit. The widest range exponent bit is associated with first and second exponent ranges. The first exponent range, which may correspond to the set state of the widest range exponent bit, may be associated with the exponent range of the floating-point computation unit, typically the exponent range of the register format. The second exponent range, which may correspond to the reset state of the widest range exponent bit, may be associated with the exponent range of the memory format. When the WRE bit is set, an exception is generated if the result, typically an intermediate result, is incompatible with the first exponent range; when the WRE bit is reset, an exception is generated if the result, typically a final result, is incompatible with the second exponent range. Incompatibility of the result with each exponent range is established if the result meets a predetermined condition. By way of example, when the WRE bit is set, an overflow exception may be generated if the exponent of the result exceeds the first exponent range; and when the WRE bit is reset, an overflow exception may be generated if the exponent of the result exceeds the second exponent range. Thus, when the WRE bit is set, the exponent range of the corresponding calculation may be increased by one or more bits. The intermediate steps of the calculation can proceed without generating an overflow exception, even though the exponent exceeds the range of the memory format during intermediate steps of the calculation. Referring again to FIG. 11, the WRE bit is set in steps 302, 304, 306 and 308 and then is reset in final step 310. Thus, the calculation proceeds to completion without generation of an overflow exception, and the exponent of the final result is compatible with the memory format. As discussed below, the WRE bit may be used to control the reporting of other types of exceptions.

The WRE bit may be used in architectures having more than one floating-point status field as described above, as well as in architectures having a single floating-point status field. When the floating-point status register has two or more status fields, intermediate steps of the calculation may reference an alternate status field having the WRE bit set, and the final step of the calculation may reference main status field sf0 having the WRE bit reset. When the floating-point status register has a single status field, the WRE bit may be set during the intermediate steps, and may be reset prior to the final step of the calculation.

The WRE bit has been described in connection with writing the final result of a calculation to memory using a memory format. More generally, the WRE bit may be used in any application where the exponent of the intermediate result might need to be larger than the exponent of the final result. Thus, for example, the final result may be transmitted to an external device in a specified format. The sizes of the first and second exponent ranges, associated with set and reset states of the WRE bit, depend on a particular architecture. As noted above, the first exponent range is preferably at least two bits wider than the second exponent range.

The WRE bit is not limited to preventing overflow exceptions. The WRE bit may be used, for example, to prevent underflow exceptions, inexact exceptions, or any other exceptions which are not required to be recorded in intermediate steps but which are required to be recorded in the final step of a calculation. The WRE bit prevents generation of unnecessary exceptions and thereby enhances performance.

The WRE bit has been described as a control bit in the floating-point status register. In another embodiment, the WRE bit may be specified in the instruction format. A disadvantage of this approach is that the instruction is required to have an extra bit or an extra state. An advantage of this approach is that updating of the floating-point status register is not required. In either case, the WRE bit is controlled by the programmer.

A further feature of the invention relates to operation with "big endian" (BE) and "little endian" (LE) formats. In big endian format, a data word is stored in memory with its most significant byte corresponding to the most significant byte of the memory word. In little endian format, the data word is stored in memory with its least significant byte corresponding to the most significant byte of the memory word. Data may be stored in both formats in memory, but only one of the formats is permitted in the registers of the processor. Big endian or little endian format may be controlled by an endian control bit in a control register. The state of the big endian/ little endian control bit is controlled by software.

As described above, floating-point data may be stored in memory in the IEEE formats shown in FIG. 9 and may be handled in the floating-point registers in a register format that is different from the IEEE format. In some processor operations, the floating-point data is converted from register format to IEEE format and then is stored in memory, or vice versa. In other processor operations, known as spill/fill operations, the floating-point data is written to memory in register format without first converting the floating-point number to IEEE format. Similarly, when the floating-point data is read from memory, it is already in register format and format conversion is not required. Spill/fill operations may be performed, for example, when a program is interrupted.

Figure 12:
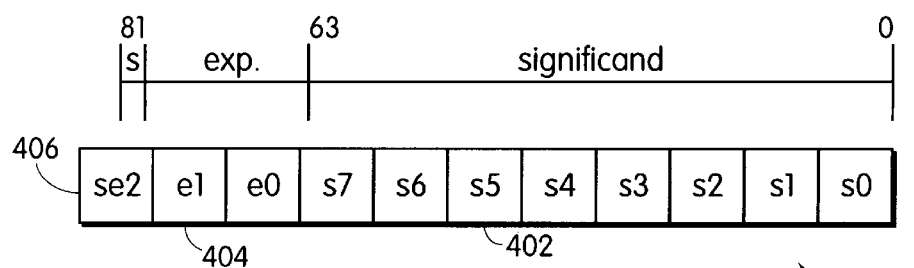
FIG. 12 illustrates an example of a floating-point register format in byte representation.

The spill/fill operation is described with reference to FIGS. 12 and 13. The floating-point register format is shown in byte representation in FIG. 12. Specifically, a register format 400 includes a significand having eight bytes s0–s7, an exponent 404 having two bytes e0 and e1, and a single sign byte se2. The floating-point register format 400 has a total of 82 bits.

Figure 13:
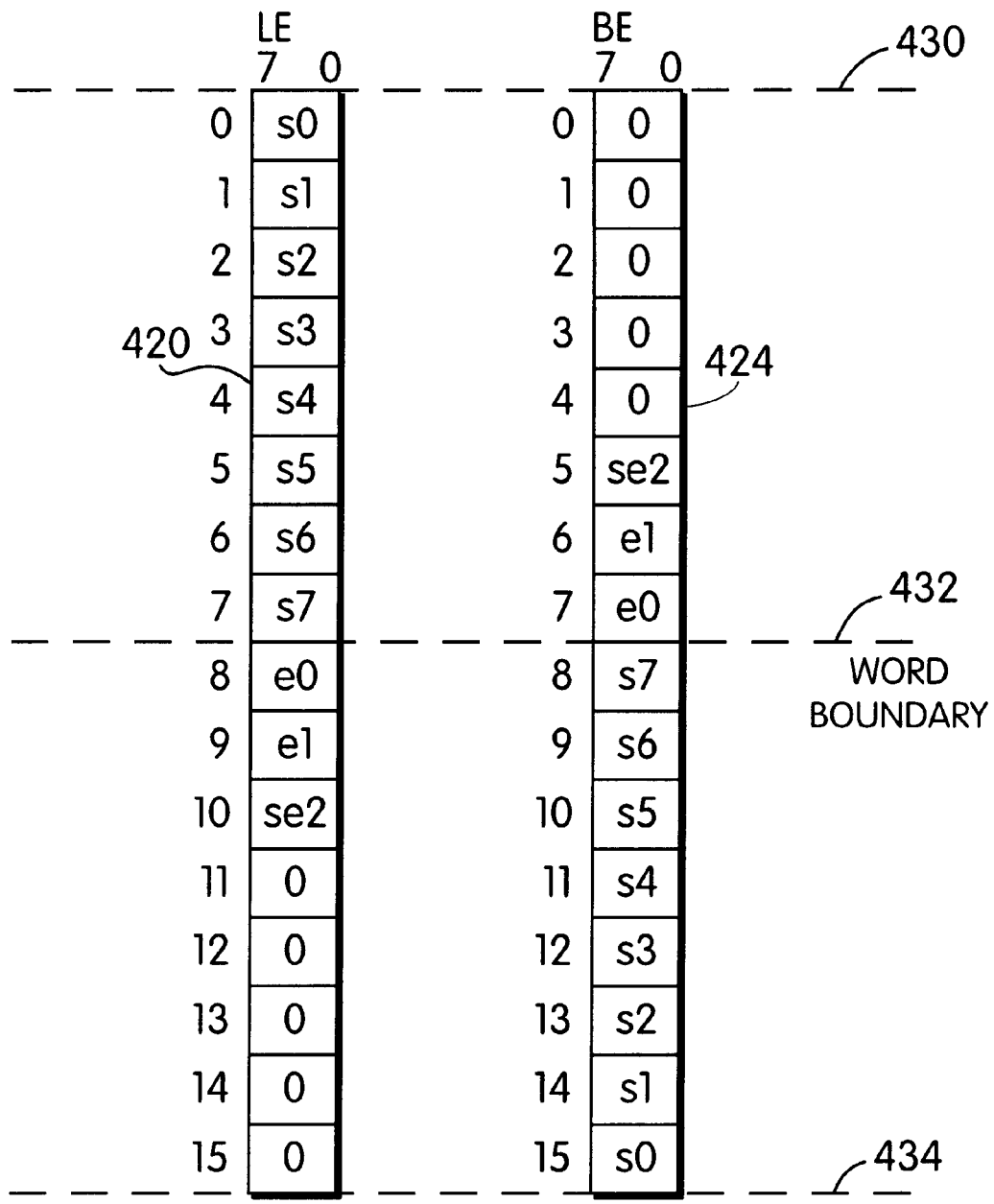
FIG. 13 illustrates memory formats for storing floating-point numbers in big endian and little endian formats during spill and fill operations.

The 82 bits of the floating-point register format may be stored in a 128-bit memory field in big endian or little endian format as shown in FIG. 13. In FIG. 13, format 420 represents the result of a spill/fill operation of the register format in little endian format. Format 424 represents the result of a spill/fill operation in big endian format. The numbers to the left of each format represent increasing memory addresses. In little endian format 420, the least significant byte s0 of the significand is stored at the lowest memory address of a 128-bit memory field. In big endian format 424, the least significant byte s0 of the significand is stored at the highest memory address of a 128-bit memory field. In each case, zeros of the 128-bit field are the most significant bits of the respective floating-point number. In FIG. 13, dashed lines 430, 432 and 434 represent 8-byte word boundaries and define first and second consecutive memory words. Thus, in little endian format, the significand is stored in a first memory word between word boundaries 430 and 432, and the exponent and the sign are stored in a second memory word between word boundaries 432 and 434. In big endian format, the exponent and the sign are stored in the first memory word between word boundaries 430 and 432, and the significand is stored in the second memory word between word boundaries 432 and 434.

Little endian format 420 and big endian format 424 both permit the significand to be accessed with an 8-byte access and permit the exponent and the sign to be accessed with an 8-byte access. That is, either or both components of the floating-point number may be accessed separately since the exponent and the sign are confined to one 8-byte word and the significand is confined to another 8-byte word in both BE and LE formats. In addition, the formats 420 and 424 shown in FIG. 13 and described above permit control bits to be added to the floatingpoint field in the positions occupied by zeros, without affecting existing data. In particular, control bits and other information may be added to bytes 11–15 in LE format 420, and such information may be added to bytes 0–4 in BE format 424.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for handling and storing floating-point numbers in a computer comprising a floating-point computation unit, a memory and floating-point registers, comprising the steps of:

holding floating-point numbers in said floating-point registers in a register format wherein each of said floating-point numbers includes a sign, an exponent and a significand, each of said floating-point numbers in said register format having more bytes than a word in said memory;

in response to a first state of an endian control bit, storing a floating-point number in first and second consecutive memory words in big endian format such that said sign and said exponent are entirely contained in said first memory word and said significand is entirely contained in said second memory word; and in response to a second state of the endian control bit, storing a floating-point number in said first and second consecutive memory words in little endian format such that said significand is entirely contained in said first memory word and said sign and said exponent are entirely contained in said second memory word.

2. A method for handling and storing floating-point numbers as defined in claim 1 wherein each of said memory words has eight bytes and wherein said register format comprises an eight-byte significand, a two-byte exponent and a one-byte sign.

3. A method for handling and storing floating-point numbers as defined in claim 1 wherein the steps of storing said floating-point numbers are executed without conversion from said register format.

4. A method for handling and storing floating-point numbers as defined in claim 1 wherein the step of storing a floating-point number in big endian format comprises storing zeros in the most significant byte locations of the memory word containing said exponent and said sign.

5. A method for handling and storing floating-point numbers as defined in claim 1 wherein the step of storing a floating-point number in little endian format comprises storing zeros in the least significant byte locations of the memory word containing said exponent and said sign.

6. A method for handling and storing floating-point numbers as defined in claim 1 wherein the step of storing a floating-point number in big endian format comprises storing said sign, said exponent and said significand in consecutive byte locations of said first and second memory words.

7. A method for handling and storing floating-point numbers as defined in claim 1 wherein the step of storing a floating-point number in little endian format comprises storing said sign, said exponent and said significand in consecutive byte locations of said first and second memory words.

8. Apparatus for handling and storing floating-point numbers comprising:

a computer comprising a floating-point computation unit, a memory and floating-point registers;

means for holding floating-point numbers in said floating-point registers in a register format wherein each of said floating-point numbers includes a sign, an exponent and a significand, each of said floating-point numbers in said register format having more bytes than a word in said memory;

means, responsive to a first state of an endian control bit, for storing a floating-point number in first and second consecutive memory words in big endian format such that said sign and said exponent are entirely contained in said first memory word and said significand is entirely contained in said second memory word; and means, responsive to a second state of the endian control bit, for storing a floating-point number in said first and second consecutive memory words in little endian format such that said significand is entirely contained in said first memory word and said sign and said exponent are entirely contained in said second memory word.

9. Apparatus for handling and storing floating-point numbers as defined in claim 8 wherein each of said memory words has eight bytes and wherein said register format comprises an eight-byte significand, a two-byte exponent and a one-byte sign.

10. Apparatus for handling and storing floating-point numbers as defined in claim 8 wherein said floating-point numbers are stored without conversion from said register format.

11. Apparatus for handling and storing floating-point numbers as defined in claim 8 wherein said means for storing a floating-point number in big endian format comprises means for storing zeros in the most significant byte locations of the memory word containing said exponent and said sign.

12. Apparatus for handling and storing floating-point numbers as defined in claim 8 wherein said means for storing a floating-point number in little endian format comprises means for storing zeros in the least significant byte locations of the memory word containing said exponent and said sign.

13. Apparatus for handling and storing floating-point numbers as defined in claim 8 wherein said means for storing a floating-point number in big endian format comprises means for storing said sign, said exponent and said significand in consecutive byte locations of said first and second memory words.

14. Apparatus for handling and storing floating-point numbers as defined in claim 8 wherein said means for storing a floating-point number in little endian format comprises means for storing said sign, said exponent and said significand in consecutive byte locations of said first and second memory words.

* * * * *